United States Patent Office 3,741,731
Patented June 26, 1973

3,741,731
EXTRACTION OF BORON FROM AQUEOUS SOLUTIONS WITH SALICYLIC ACID DERIVATIVES
Willard D. Peterson, Pasadena, Calif., assignor to Occidental Petroleum Corporation, Los Angeles, Calif.
No Drawing. Filed Aug. 18, 1971, Ser. No. 172,904
Int. Cl. B01j 9/04
U.S. Cl. 23—312 R
13 Claims

ABSTRACT OF THE DISCLOSURE

A process for extracting boron values from aqueous boron containing solutions by contacting the aqueous solution with a substantially water immiscible solvent containing a substantially water immiscible nuclear-substituted salicylic acid having the formula

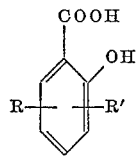

and salts thereof wherein R and R' are selected from the group consisting of hydrogen, halogen, alkyl, aryl, alkaryl, and cycloalkyl groups having sufficient carbon atoms that the salicylic acid derivatives has at least 11 carbon atoms. Preferably R is selected from the group consisting of alkyl, alkaryl, cycloalkyl, and aryl radicals having at least three carbon atoms and R' is selected from the group consisting of hydrogen, halogen and alkyl groups. The boron is sequestered by the salicylic acid derivative and thereby is extracted from the aqueous phase into the organic phase.

BACKGROUND

The concentration of boron compounds in aqueous medium may vary widely, for example from 5 parts per million to 1 molar, depending on source. In many natural and artificial waters and brines, and in dilute solutions from many processes boron is often present in relatively low concentrations. Often it is desirable to remove boron from such solutions for purification purposes such as, for example, removal of boron contamination from irrigation waters. In some places, large amounts of water are not suitable for irrigation because the boron content exceeds two or three parts per million, which is the tolerable limit for citrus and some other agricultural crops. Large scale economical removal of boron from such dilute solutions is desirable. Boron contamination is commonly present in magnesium chloride brines, and it interferes with subsequent production of magnesium metal by way of electrowinning operations. In many other situations, it is desirable to remove boron contamination.

The quantity of boron that may be contained in some brines is sufficient that recovery of the boron from the brine is economical as a source of relatively high purity boron compounds, preferably boric acid, which has a relatively high market value as compared, for example, with borax.

Boron values can be extracted from aqueous solutions by passing the solution in contact with an ion exchange resin which may sequester the boron for later stripping in a conventional manner. Solid ion exchange resins have certain technical difficulties in handling large volumes of solutions because of the relatively low rates of sequestering, and the problems of contamination of the ion exchange bed by particulate material and the like.

Another technique for removing boron values from dilute aqueous solutions and brines is by liquid-liquid extraction wherein the aqueous phase is contacted with a water immiscible organic phase containing a material with which the boron is complexed so as to partition principally to the organic phase instead of the aqueous phase. The boron depleted aqueous phase and boron containing organic phase are separated so that the boron can be extracted therefrom by contacting the organic phase with a strong acid or strong base as may be desired.

Various materials have been employed for extracting boron values, such as, for example, β-aliphatic diols as disclosed in U.S. Pat. 3,493,349, or other organic diols as disclosed in U.S. Pat. 3,424,563. Certain catechols such as disclosed in U.S. Pat. 3,433,604 may also be used. Other boron extractants are disclosed in U.S. Pat. 3,111,-383. Certain aliphatic alcohols have also been employed in boron extraction processes.

Most prior art boron extraction processes involve relatively expensive sequestering compounds, and because of the large amount of such materials required for large-scale commercial operations, economy is extremely important. Similarly, some extractants such as catechols are most effective in extracting boron from substantially neutral brines, and poor extraction efficiency may be found with acidic brines. Other extraction processes require that the brines be acidic in order to prevent metal hydroxide precipitation and under these conditions, result in very poor extraction efficiency by most of the previously described boron extracting agents.

It is therefore desirable to provide a boron extraction process that is suitable for mildly acid brines as well as slightly basic ones, and also to provide a boron extraction process that is sufficiently economical to be used in large-scale operations.

BRIEF SUMMARY OF THE INVENTION

There is therefore provided in practice of this invention a liquid-liquid process for extracting boron from an aqueous boron containing solution comprising the step of contacting the aqueous solution with a water immiscible solvent containing a substantially water immiscible salicylic acid derivative, mono-or di-nuclear substituted with radicals selected from the group consisting of hydrogen, halogen alkyl, aryl, alkaryl, and cycloalkyl radicals having sufficient carbon atoms that the salicylic acid derivatives has at least 11 carbon atoms and preferably less than about 40 carbon atoms. At least one radical is selected from the group consisting of alkyl, alkaryl, cycloalkyl and aryl radicals having at least three carbon atoms and the other radical is preferably selected from the group consisting of hydrogen, halogen and alkyl groups. Alkali, alkaline earth, ammonium and organic ammonium salts of the substituted salicylic acid are also suitable.

DESCRIPTION

It has been found that boron and to some extent other cations, such as magnesium, potassium, and sodium may be extracted from aqueous solutions containing boron by contacting the solution with one or more substantially water immiscible organic extraction agents in a substantially water immiscible organic solvent. The extraction agent sequesters the boron in the organic phase, which is then treated to remove the boron values therefrom. Such a process may be easily conducted either as a batch or continuous process.

The preferred extraction agent employed in practice of this invention is a substituted water immiscible salicylic acid derivative having the formula

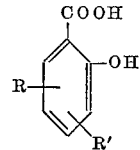

where R and R' represent radicals selected from the class consisting of hydrogen, halogen, alkyl radicals, aryl radicals, alkaryl radicals, cycloalkyl radicals, and mixtures thereof. Alkali, alkaline earth, ammonium and organic ammonium salts of the acid are also useful. For best results the derivative of salicyclic acid has a total of at least 11 carbon atoms and preferably less than about 40 carbon atoms. The salicylic acid derivatives containing a tertiary alkyl group from 8 to 12 carbon atoms in the 5-position are particularly preferred. One of the nuclear substitution radicals is selected from the group consisting of alkyl, alkaryl, cycloalkyl and aryl radicals having at least four carbon atoms. The other radical is preferably selected from the group consisting of hydrogen, halogen and alkyl groups.

In particular it is preferred to employ salicylic acid derivatives mono- or di-substituted in the 3- and 5-positions, that is, in the formula

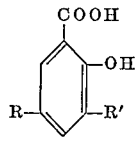

The highly branched alkyl substituted salicylic acid derivatives are preferred because of ease of synthesis from readily available raw materials and excellent water immiscibility. A particularly preferred derivative is 5-tertiary octyl salicylic acid because of its sequestering ability, relatively low cost, and good solubility in the water immiscible carrier. This salicylic acid derivative is readily synthesized from p-tertiary octyl phenol by a slightly modified Kolbe-Schmitt reaction. The phenol is more explicitly p-(1,1,3,3-tetramethyl butyl)-phenol and it is believed that the highly branched alkyl group is unchanged in synthesis of the salicylic acid derivative. A small proportion of isomers of the alkyl group are possibly present. The salicylic acid derivative may also be alkylated or halogenated, specifically chlorinated, at the 3-position. Such substitution not only increases water immiscibility, it also enhances the boron sequestering action obtained from the adjacent ortho hydroxy carboxy grouping of the salicylic acid derivative in some brine systems. Specific examples include 3,5-di-isopropyl salicylic acid and 3,5-di-tertiary butyl salicylic acid which are readily prepared from 2,4-di-isopropyl phenol and 2,4-di-tertiary butyl phenol by the Kolbe-Schmitt carboxylation process.

The derivatives of salicylic acid are also meant to include a double ring structure such as 1-carboxy-2-hydroxynaphthalene, 1-hydroxy-2 carboxynaphthalene, or 2-carboxyl-3 hydroxynaphthalene with sufficient carbon atoms in substituted radicals other places on the ring to render the compound water immiscible. It will be recognized that each of these compounds involves a nuclear substitution of at least four carbon atoms.

Suitable salicylic acid derivatives also include 5-tertiary butyl salicylic acid, 5-tertiary octyl salicylic acid, 5-tertiary amyl salicylic acid, 5-iso-octyl salicylic acid, 5-tertiary nonyl salicylic acid, 3,5-di-tertiary butyl salicylic acid, 5-benzyl salicylic acid, 5-cyclohexyl salicylic acid, 3-isopropyl-6-methyl salicylic acid, 3-methyl-6-isopropyl salicylic acid, and 3-isobutyl-5-ethyl salicylic acid. A variety of additional suitable salicylic acid derivatives, such as, for example, 3,5-di-tertiary dodecyl salicylic acid will be apparent to one skilled in the art. Mixtures of derivatives are also suitable which may afford lower cost by eliminating separating steps in synthesis.

The salicylic acid derivative contains at least 11 carbon atoms in order to have sufficient water immiscibility that only a very small quantity of the extraction agent is carried away in the boron depleted water or in the strong acid or base used for stripping the boron from the organic phase. When the salicylic acid derivative has less than 11 carbon atoms it may be sufficiently soluble in water to be uneconomical for very large-scale operation. Preferably, the salicylic acid derivative has less than about 40 carbon atoms in the molecule, since such derivatives can be made from commercially available raw materials without excessive cost.

It is particularly preferred that the salicylic acid derivatives contain a tertiary alkyl group having from 8 to 12 carbon atoms substituted in the 5-position, that is, as one of the radicals in the above formula. Such salicylic acid derivatives are found to have excellent stability in the organic carrier solvent as well as excellent water immiscibility so as to remain in the organic phase during the extraction step with a boron containing brine, and during the stripping step when in contact with a strong acid or base. These materials are stable so that they do not decompose readily and can be recycled many times. If the derivative has a radical having less than eight carbon atoms it may have excessive water solubility for use in large-scale boron extraction operations. If the salicylic acid derivative has a tertiary alkyl group having more than about 12 carbon atoms, the expense of the raw materials for making the derivative is sufficiently high that the product is not suitable for large-scale operations.

The alkali, alkaline earth, ammonium and organic ammonium salts of the above-described nuclear substituted salicylic acid derivatives may also be used. Such salts are advantageous when it is desired to minimize change of pH in the boron-containing aqueous phase. Generally pH decreases if a substituted salicylic acid in its acid form is used since hydrogen ion is released when boron is sequestered. If a salt of the substituted salicylic acid is used the sequestering of boron does not involve direct release of hydrogen ion but only an exchange with the cation species. Such salt of the substituted salicylic acid is generated by the stripping treatment of the boron loaded extract if caustic or other alkaline agent is used for this operation. Alternately, the salt of the substituted salicylic acid may be generated from the free acid prior to recycle to the boron extraction stage.

The boron extractive agent is carried in a water immiscible carrier solvent that provides a separate phase that can be intimately contacted with the aqueous phase without forming strong emulsions, so that it separates relatively rapidly. A variety of such inert organic carriers are available and well known to those skilled in the art and include water immiscible aliphatic hydrocarbons, aromatic hydrocarbons, aliphatic or aromatic alcohols, phenolics, ethers, chlorocarbons and the like, either alone or in the form of mixtures which may be advantageously employed to enhance the solubility and effectiveness of the salicylic acid derivative. Saturated aliphatic hydrocarbons containing a minor proportion, preferably about ten volume percent, of aromatic hydrocarbons are preferred. Distillation cuts or fractions from petroleum refining having mixtures of organic compounds form inexpensive and suitable organic carriers. Exemplary of such carriers are Amsco Solvent-G, kerosene, o-xylene, isodecanol, toluene and the like. As pointed out in copending U.S. patent application Ser. No. 175,007 entitled "Extraction of Boron From Aqueous Solutions With Salicylic Acid Derivatives and Isoamyl Alcohol," by Edward A. Grannen, and assigned to Occidental Petroleum Corporation, assignee of this application, isoamyl alcohol in the organic phase has a synergistic effect with the salicylic acid derivative for enhanced boron extraction. Adjuncts in the organic phase may include water immiscible primary, secondary, tertiary, and quaternary alkyl amines, which contain at least 12 carbon atoms, ammonium salts of such amines and water immiscible aliphatic alcohols.

The concentration of nuclear substituted salicylic acid is preferably in the range from about 0.03 molar to the solubility limit. The particular concentration employed for extraction will depend on the type of boron containing aqueous medium to be treated, generally lower boron values being extracted with lower concentration organic solutions. Generally if the concentration is less than about 0.03 molar so little sequestering agent is present that the reaction is uneconomically slow. The solubility limit is the upper end of the range so that this remains a liquid-liquid extraction. Even the solid substituted acid will extract boron, but contact with surfaces is difficult.

The organic phase comprising the salicylic acid derivative in a suitable water immiscible carrier is intimately contacted with the boron containing aqueous solution in any suitable conventional manner, such as, for example, by counter-current flow, stirring, shaking, and the like.

The volume ratio of organic phase to aqueous phase is preferably in the range of from about 1:50 to 10:1, or even higher. Phase ratios ranging from about 1:10 to 10:1 are generally preferred for most economical extraction with the least number of extraction steps for complete extraction without significant loss of extraction agent. A relatively high volume ratio of organic phase to aqueous phase is preferably employed when the boron concentration in the aqueous solution is relatively low, or where the highest possible extraction efficiency is desired.

As is well known, extraction efficiency is enhanced by serially performing the extraction step with organic phase having successively lower boron concentrations, i.e., by a countercurrent multiple extraction process. The number or repetitions of the process will vary depending on the desired degree of extraction and the original boron concentration. Contact times between the organic and aqueous phase in excess of about one minute may be required for adequate extraction, and a contact time in the range of from one to five minutes is preferred.

The extraction is preferably conducted so that the final pH of the boron deficient aqueous solution is between about 0.5 and 9.0. The final pH depends in large part on the nature and concentration of materials other than boron in the aqueous solution. It is particularly preferred that the extraction be conducted to yield a final pH in the boron deficient solution in the range of from about 1 to 7 in order to obtain highest efficiency of boron extraction for most aqueous solutions. Temperature of the liquids during the extraction step is not critical and is typically in the range of from about 10 to 80° C. It is most convenient to perform the process at or near room temperature or the ambient temperature of the aqueous solution source.

The process of extracting boron with the above-described salicylic acid derivatives is particularly advantageous in natural brines containing iodine. Catechols and other boron sequestering agents often react with iodine and both the catechol and iodine may be lost. Some natural brines contain as high as 2 grams per liter of iodine. Processes for extracting boron from iodine containing brines are satisfactory since the iodine does not seem to attack the salicylic acid derivatives hereinabove described.

After the organic phase and the aqueous phase have been maintained in intimate contact for a sufficient period for the boron to be sequestered and to partition principally in the organic phase, these phases are permitted to separate by allowing layers to form and decanting one or both of such layers. The aqueous layer, now substantially depleted in boron, may be subjected to an additional similar extraction step for further depleting the boron or may be otherwise used in commerce in a conventional manner.

The organic phase, which is rich in boron sequestered by the salicylic acid, is then stripped of such boron values by intimately contacting the organic phase with an aqueous solution of a mineral acid such as nitric, hydrochloric, sulfuric, sulfurous, phosphoric, or the like. The boron values partition to the aqueous phase and may be separated therefrom by conventional techniques. Thus, for example, when sulfuric acid is employed, the stripping aqueous phase may include magnesium sulfate and boric acid in the sulfuric acid solution, and the boric acid may be precipitated in relatively high purity form. Similarly, if desired, the organic phase can be stripped of boron values by contacting with an alkaline solution, such as, for example, sodium carbonate in order to recover boron in the form of borax; however, this has lower economic value in most cases and stripping with mineral acid is preefrred. As mentioned, stripping with alkaline solution results in a salt of the substituted salicylic acid derivative and hence less change in pH in the aqueous phase upon recycling.

The organic phase is substantially free of boron after stripping and is preferably recycled and reused for additional boron extraction.

The fact that boric acid forms complexes with salicylic acid has been recognized for many years. The boron is apparently sequestered by the adjacent carboxy and hydroxy groups. H. Schafer has published papers relating to water soluble salicyl-borate complexes and their relative stabilities in Angew. Chem., A60 (1948), p. 73; Z. Anorg. Chem., 250 (1942) pp. 82–109; and Z. Anorg. Chem., 250 (1942), pp. 127–44. See also Kolthoff's paper in Recueil Trav. Chim. Pays-Bas, 45, (1926), p. 607. No. water immiscible salicylic acid derivatives have been known.

The salicylic acid derivatives are conveniently made by the well known Kolbe-Schmitt reaction, wherein an alkylated phenol as its dry salt is carboxylated under elevated temperatures and pressures to form the sodium or potassium salt. The acid is then generated with a mineral acid.

It is preferred to employ an alkylated phenol as the synthesis raw material since such materials are readily commercially available in large quantities at quite low cost and are extensively used in the detergent industry. Suitable beginning alkylated phenols include p-tertiary butyl phenol, p-tertiary octyl phenol, p-tertiary amyl phenol, p-tertiary nonyl phenol, o,p-di-tertiary butyl phenol, p-benzyl phenol, p-cyclohexyl phenol, and o-isobutyl-p-ethyl phenol. Other related phenols are clearly usable for other desired salicylic acid derivatives. Thymol and its homologs are also useful.

Examples

Example 1.—Boron was extracted from a magnesium chloride brine having about 36 weight percent magnesium chloride, 0.1 percent by weight calcium ion, and 0.3 percent by weight sodium ion. The boron content was about 77 milligrams per liter, and the brine had a pH of about 5.98. An organic extractant phase was formulated comprising a carrier of kerosene having 5 percent by volume of 2-octanol, both of which are substantially immiscible with water. The organic extractant phase had sufficient 5-tertiary octyl salicylic acid to produce a solution 0.2 molar in said acid (more explicitly the compound is 5-(1,1,3,3-tetramethyl butyl) salicylic acid).

The aqueous magnesium chloride brine and organic extractant were intimately contacted by agitation with a volume ratio of two parts organic phase to one part of aqueous phase. Agitation was continued for about ten minutes at approximately room temperature while maintaining the pH in the range of 6.0±0.3 with additions of ten normal sodium hydroxide as required. After phase separation, analysis of the aqueous phase typically shows that about 53% of the boron has been extracted from the brine.

Example 2.—Boron was extracted from a brine having about 35 weight percent sodium nitrate, 17.2 weight percent sodium chloride, and 1.7 weight percent total potassium. The brine had a boron content equivalent to 26 grams per liter of boric acid, and a pH of 5.0.

One volume of this boron containing brine was agitated for ten minutes at room temperature with 2.5 volumes of an organic extractant that was 0.1 molar 5-tertiary octyl salicylic acid in a mixture of 50% by volume of an aromatic hydrocarbon petroleum cut having an initial boiling point of 363° F., a 50% boiling point of 381° F., and a dry end point of 408° F. (Amsco Solvent G) and 50% by volume iso-decanol. After phase separation the brine phase typically has a pH of 4.3 and 56% of the boron values have been removed.

Example 3.—When the brine of Example 2 is agitated with five volumes of the same organic phase as in Example 2, a final brine pH of about 4.2 is obtained and 71% of the boron values are removed from the brine.

Example 4.—The same brine as in Example 2 was extracted by agitating for ten minutes at room temperature with 2.5 volumes of organic extractant of 0.1 molar 5-tertiary octyl salicylic acid, and 0.1 molar methyl tri-octyl ammonium chloride (Aliquat 336) in a 50% by volume mixture of Amsco Solvent G and 50% isodecanol. Typically, the brine has a final pH of 3.8 and 56% of the boron is removed.

Example 5.—Another suitable organic extractant comprises 0.1 molar 5-isooctyl salicylic acid in a solvent comprising 75% by volume aromatic hydrocarbon (Amsco Solvent G) and 25% isoamyl alcohol. Two volumes of this organic phase was agitated with one volume of aqueous phase comprising a boron containing, principally sodium nitrate and sodium chloride, brine. The brine had a pH of 5.0 before extraction and 4.3 after extraction. It was found that 48% of the boron was extracted from the brine.

Example 6.—Another extractant similar to that of Example 5 differs only in that the organic phase comprises 50% by volume Amsco Solvent G and 50% isoamyl alcohol. The pH of the brine after agitation is typically 4.5 and it was found that about 58% of the boron is extracted from the aqueous phase.

Example 7.—Another process for the nitrate brine is substantially the same as Example 5 except for the composition of the organic phase. This phase in addition to being 0.1 molar 5-isooctyl salicylic acid is also 0.1 molar in methyl tri-octyl ammonium chloride, and the solvent is 50% by volume Amsco Solvent G and 50% isoamyl alcohol. The pH after extraction is as low as 2.7 and it is found that about 75% of the boron is typically extracted from the aqueous phase.

Example 8.—Using procedures and parameters as set forth hereinabove satisfactory boron extractions are also obtained using organic phases as set forth in the following table:

| Salicylic Acid (SA) derivative | Concentration | Organic solvent |
|---|---|---|
| t-ertiary butyl SA | 0.1M | 50% Amsco G, 50% isodecanol. |
| 3,5-di-iso-amyl SA | 0.2M | Do. |
| 5-cyclohexyl SA | 0.05M | 94% Amsco G, 6% 2-octanol. |
| Do | 0.2M | Do. |
| 5-tertiary hexyl SA | 0.1M | Amsco G. |
| 5-iso-octyl SA | 0.4M | 50% Amsco G, 50% isodecanol. |
| Do | 0.2M | 75% Amsco G, 25% isodecanol. |
| Do | 0.05M | Do. |
| 3,5-di-tertiary dodecyl SA | 0.1M | Do. |
| 3,5-di-tertiary butyl SA | 0.2M | 50% Amsco G, 50% isoamyl alcohol. |
| 5-tertiary amyl SA | 0.1M | Do. |
| 5-tertiary nonyl SA | 0.1M | Do. |
| 3-ethyl-5 cyclohexyl SA | 0.15M | Do. |
| 3-amyl-5 tertiary octyl SA | 0.1M | Do. |
| 3-isobutyl-5 ethyl SA | 0.1M | Do. |
| 3,5-di-tertiary nonyl SA | 0.1M | Do. |
| 5-benzyl SA | 0.1M | Do. |
| 3,5-di-tertiary decyl SA | 0.1M | Do. |
| 3-isopropyl-6 methyl SA | 0.1M | Do. |
| 3-chloro-5 tertiary octyl SA | 0.1M | Do. |

Although limited examples of extractions embodying principles of this invention have been set forth in detail herein, it will be understood that many modifications and variations can be made by one skilled in the art. It is, therefore, to be understood that within the scope of the appended claims the invention may be practiced otherwise than as specifically described.

What is claimed is:

1. A liquid-liquid process for extracting boron from an aqueous boron containing solution comprising the step of:
   contacting the aqueous solution with a water immiscible solvent containing a water immiscible, nuclear substituted salicylic acid derivative having the formula

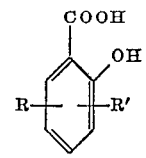

wherein R and R' are radicals selected from the group consisting of hydrogen, halogen, alkyl, aryl, alkaryl, and cycloalkyl radicals having sufficient carbon atoms that the derivative has at least 11 carbon atoms in the molecule, at least one radical is selected from the group consisting of alkyl, alkaryl, cycloalkyl and aryl groups having at least three carbon atoms, and the other radical is selected from the group consisting of hydrogen, halogen and alkyl groups; and alkali, alkaline earth, ammonium and organic ammonium salts thereof.

2. A process as defined in claim 1 wherein the molecule has less than about 40 carbon atoms.

3. A process as defined in claim 1 wherein the salicylic acid derivative has the formula

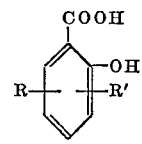

4. A process as defined in claim 3 wherein the radical R is a tertiary alkyl radical containing from 8 to 12 carbon atoms.

5. A process as defined in claim 1 wherein the salicylic acid derivative is selected from the group consisting of t-tertiary butyl salicylic acid, 5-tertiary octyl salicylic acid, 5-tertiary amyl salicylic acid, 5-tertiary nonyl salicylic acid, 3,5-di-tertiary butyl salicylic acid, 5-benzyl salicylic acid, 5-cyclohexyl salicylic acid, 5-isooctyl salicylic acid, and 3-isobutyl-5-ethyl salicylic acid.

6. A process as defined in claim 1 wherein the water immiscible solvent comprises at least a portion of aromatic hydrocarbon, the concentration of salicylic acid derivative is greater than about 0.03 molar, and wherein the volume ratio of water immiscible phase to aqueous phase is in the range of from about 1:50 to 10:1.

7. A process as defined in claim 6 wherein the extraction is conducted in a manner such that the pH of the boron depleted aqueous phase is in the range of from about 0.5 to 9.0 after extraction.

8. A process as defined in claim 1 comprising the additional steps of:
   separating the water immiscible phase from the aqueous phase;
   contacting the water immiscible phase with a sufficient amount of an aqueous acid selected from the group consisting of hydrochloric acid, nitric acid, sulfuric acid, sulfurous acid, phosphoric acid and mixtures thereof for extracting boron from the water immiscible phase; and
   recycling the water immiscible phase for additional contacting with aqueous boron containing solution.

9. A liquid-liquid process for extracting boron from an aqueous boron containing solution comprising the step of:

contacting the aqueous solution with a water immiscible solvent containing a water immiscible, nuclear substituted salicylic acid derivative having the formula

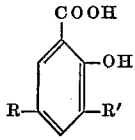

where R is selected from the group consisting of alkyl, aryl, alkaryl, and cycloalkyl radicals having at least three carbon atoms, R' is selected from the group consisting of hydrogen, halogen and alkyl groups, and wherein the derivative has at least 11 carbon atoms and less than about 40 carbon atoms; and alkali, alkaline earth, ammonium, and organic ammonium salts of the substituted salicylic acid derivative.

10. A process as defined in claim 9 wherein the radical R is a tertiary alkyl radical containing from 8 to 12 carbon atoms.

11. A process as defined in claim 9 comprising the additional steps of:

separating the water immiscible phase from the aqueous phase;

contacting the water immiscible phase with a sufficient amount of an aqueous acid selected from the group consisting of hydrochloric acid, nitric acid, sulfuric acid, sulfurous acid, phosphoric acid and mixtures thereof for extracting boron from the water immiscible phase; and recycling the water immiscible phase for additional contacting with aqueous boron containing solution.

12. A process as defined in claim 11 wherein the water immiscible solvent comprises at least a portion of aromatic hydrocarbon, the concentration of salicylic acid derivative is greater than about 0.03 molar, and wherein the volume ratio of water immiscible phase to aqueous phase is in the range of from about 1:50 to 10:1.

13. A process as defined in claim 12 wherein the extraction is conducted in a manner such that the pH of the boron depleted aqueous phase is in the range of from about 0.5 to 9.0 after extraction.

References Cited
UNITED STATES PATENTS 3,111,383  11/1963  Garrett _____ 23—312 R NORMAN YUDKOFF, Primary Examiner H. H. BERNSTEIN, Assistant Examiner U.S. Cl. X.R.

423—112

UNITED STATES PATENT OFFICE
CERTIFICATE OF CORRECTION

Patent No. 3,741,731          Dated June 26, 1973

Inventor(s) Willard D. Peterson

It is certified that error appears in the above-identified patent and that said Letters Patent are hereby corrected as shown below:

Col. 2, line 43, "derivatives" should read --derivative--

Col. 3, lines 50 and 51, "2-carboxyl-3" should read --2-carboxy-3-- line 67, "separating" should read --separation--

Col. 6, line 3, "preefrred" should read --preferred-- line 18, "No." should read --No--

Col. 7, line 49, "t-ertiary" should read --5-tertiary--

Signed and sealed this 1st day of January 1974.

(SEAL)
Attest:

EDWARD M. FLETCHER, JR.          RENE D. TEGTMEYER
Attesting Officer                Acting Commissioner of Patents